US012484848B2

(12) United States Patent
Lee et al.

(10) Patent No.: US 12,484,848 B2
(45) Date of Patent: Dec. 2, 2025

(54) DETECTION MODULE

(71) Applicant: Advanced Semiconductor Engineering, Inc., Kaohsiung (TW)

(72) Inventors: Yu-Chih Lee, Kaohsiung (TW); Chih Lung Lin, Kaohsiung (TW)

(73) Assignee: ADVANCED SEMICONDUCTOR ENGINEERING, INC., Kaohsiung (TW)

(*) Notice: Subject to any disclaimer, the term of this patent is extended or adjusted under 35 U.S.C. 154(b) by 354 days.

(21) Appl. No.: 17/377,168

(22) Filed: Jul. 15, 2021

(65) Prior Publication Data

US 2023/0019715 A1  Jan. 19, 2023

(51) Int. Cl.
*A61B 5/00* (2006.01)
*A61B 5/24* (2021.01)
*A61B 5/318* (2021.01)
*A61B 5/389* (2021.01)
*A61B 5/398* (2021.01)
*G06F 1/16* (2006.01)

(52) U.S. Cl.
CPC .............. *A61B 5/6803* (2013.01); *A61B 5/24* (2021.01); *A61B 5/318* (2021.01); *A61B 5/389* (2021.01); *A61B 5/398* (2021.01); *A61B 5/681* (2013.01); *A61B 5/6817* (2013.01); *G06F 1/163* (2013.01)

(58) Field of Classification Search
CPC ....... A61B 5/24; A61B 5/6817; A61B 5/6803; A61B 5/318; A61B 5/389; A61B 5/398; A61B 5/332; A61B 5/6802
See application file for complete search history.

(56) References Cited

U.S. PATENT DOCUMENTS

| | | | |
|---|---|---|---|
| 10,835,145 B1 * | 11/2020 | Prevoir | A61B 5/6817 |
| 10,860,114 B1 | 12/2020 | Oommen et al. | |
| 2012/0143020 A1 * | 6/2012 | Bordoley | A61B 5/291 600/383 |
| 2014/0140567 A1 * | 5/2014 | LeBoeuf | A61B 5/01 381/381 |
| 2017/0325538 A1 * | 11/2017 | Hsieh | A43B 3/35 |
| 2018/0055447 A1 * | 3/2018 | Boesen | A61B 5/6817 |
| 2018/0235540 A1 | 8/2018 | Kirszenblat et al. | |
| 2019/0053756 A1 * | 2/2019 | Ayers | A61B 5/4809 |
| 2019/0192077 A1 | 6/2019 | Kaiser et al. | |
| 2019/0200925 A1 * | 7/2019 | Aimone | A61B 5/0205 |
| 2020/0107110 A1 | 4/2020 | Ji et al. | |

(Continued)

FOREIGN PATENT DOCUMENTS

| | | |
|---|---|---|
| EP | 3 415 086 A2 | 12/2018 |
| EP | 3 451 117 A1 | 3/2019 |
| KR | 20200056744 A * | 5/2020 |

OTHER PUBLICATIONS

Extended Search Report for corresponding EP Patent Application No. 21200121.8, issued on Mar. 28, 2022, 7 pages.

(Continued)

*Primary Examiner* — John R Downey
(74) *Attorney, Agent, or Firm* — FOLEY & LARDNER LLP

(57) ABSTRACT

The present disclosure provides a detection module including a carrier configured to be adjustable to at least partially conform to a shape of a wearable object. The detection module further includes a sensing element in contact with the carrier and at least partially exposed from the carrier.

20 Claims, 13 Drawing Sheets

(56) References Cited

U.S. PATENT DOCUMENTS

| | | | |
|---|---|---|---|
| 2021/0000370 A1* | 1/2021 | Mirov | A61B 5/291 |
| 2021/0121116 A1 | 4/2021 | Kreuzer et al. | |
| 2022/0015703 A1* | 1/2022 | Mirov | A61B 5/0006 |
| 2023/0157607 A1* | 5/2023 | Guermonprez | A61B 5/27 |
| | | | 600/379 |

OTHER PUBLICATIONS

Final Office Action for U.S. Appl. No. 16/823,074, issued Jul. 9, 2021, 16 pages.
Non-Final Office Action for U.S. Appl. No. 16/823,074, issued Dec. 10, 2021, 17 pages.
Non-Final Office Action for U.S. Appl. No. 16/823,074, issued Jan. 21, 2021, 13 pages.
Final Office Action for U.S. Appl. No. 16/823,074, issued May 20, 2022, 11 pages.
Notice of Allowance for U.S. Appl. No. 16/823,074, issued Aug. 3, 2022, 6 pages.
U.S. Appl. No. 16/823,074, filed Mar. 18, 2020, Huang et al.
Search Report for corresponding EP Patent Application No. 21200121.8, issued on Aug. 5, 2025, 6 pages.

* cited by examiner

DETECTION MODULE

BACKGROUND

1. Technical Field

The present disclosure relates generally to a detection module, and in particular, to a detection module of a wearable object to monitor health status of subjects.

2. Description of the Related Art

With the development of technology, the demand for providing healthcare using advanced technology is increasing. Many sensors are used to detect or otherwise receive health-related information (e.g., biosignals) from subjects to monitor their health status.

SUMMARY

In some arrangements, a detection module includes a carrier configured to be adjustable to at least partially conform to a shape of a wearable object, and a sensing element supported by the carrier and at least partially exposed from the carrier.

In some arrangements, a detection module includes an adjustable carrier configured to be attachable to and detachable from a wearable object that is at least partially covered by the adjustable carrier. The detection module also includes a sensing element supported by the adjustable carrier. The sensing element is configured to detect information of a user wearing the wearable object.

In some arrangements, a detection module includes an adjustable carrier configured to be attachable to and detachable from a region of a wearable object. The region of the wearable object is at least partially covered by the adjustable carrier and adjacent to a user's skin when the wearable object is worn by the user. The detection module also includes a sensing element supported by the adjustable carrier and at least partially exposed from the adjustable carrier.

BRIEF DESCRIPTION OF THE DRAWINGS

Aspects of some arrangements of the present disclosure are best understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1A:
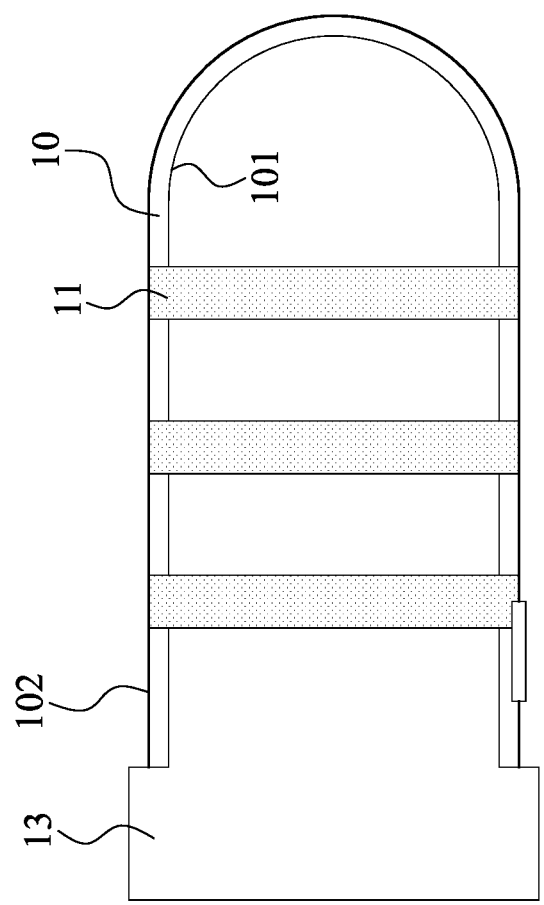
FIG. 1A is a cross-sectional view of a detection module in accordance with some arrangements of the present disclosure.

The following disclosure provides for different arrangements or examples for implementing various features of the provided subject matter. Specific examples of components and arrangements are described as follows to explain certain aspects of the present disclosure. These are examples and are not intended to be limiting. For example, the formation of a first feature over or on a second feature in the description that follows may include arrangements in which the first and second features are formed or disposed in direct contact, and may also include arrangements in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various arrangements and/or configurations discussed.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of arrangements of this disclosure are not deviated from by such arrangement.

The arrangements disclosed herein relate to electronic devices and methods of manufacturing the same. In particular, the arrangements disclosed herein relate to electronic devices used to obtain biosignals of subjects and methods of manufacturing the same with improved convenience and accuracy.

FIG. 1A is a cross-sectional view of a detection module 1 in accordance with some arrangements of the present disclosure. The detection module 1 may include a carrier 10 and a sensing element 11. In some arrangements, the detection module 1 may be configured to be used in combination with a wearable object 13 (also referred to herein as an "object").

Figure 4A:
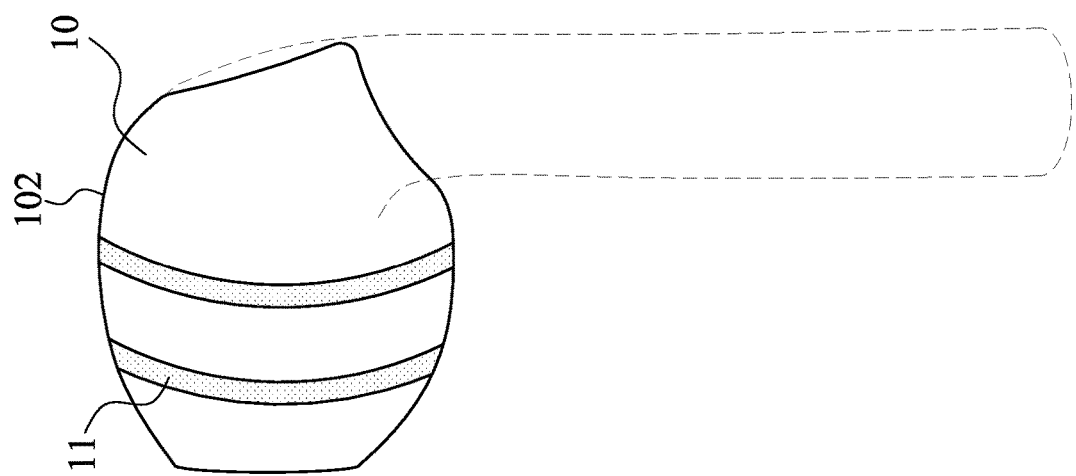
FIG. 4A is a perspective view of a detection module in application to an earpiece in accordance with some arrangements of the present disclosure.
Figure 4B:
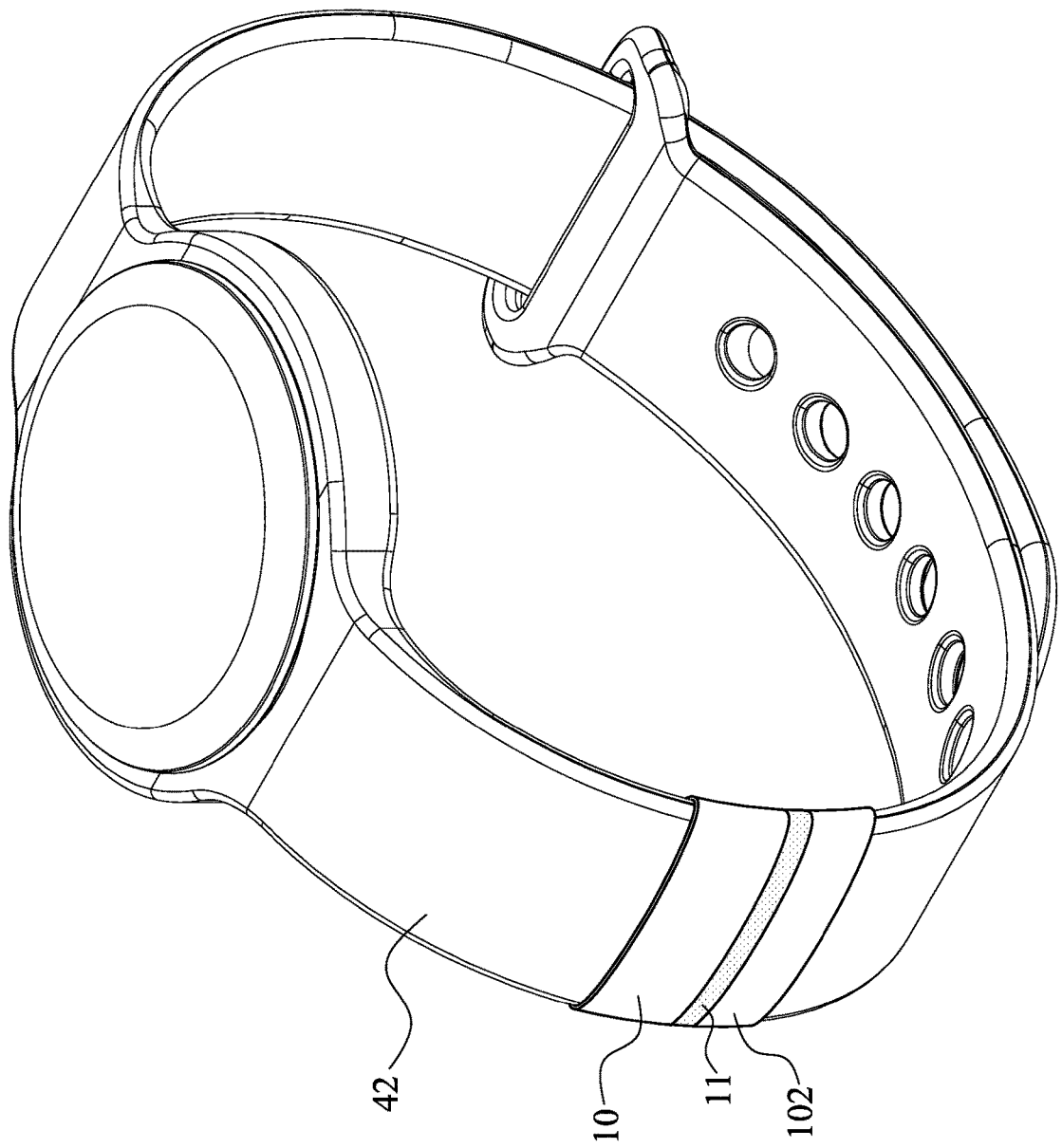
FIG. 4B is a perspective view of a detection module in application to a watch in accordance with some arrangements of the present disclosure.
Figure 4C:
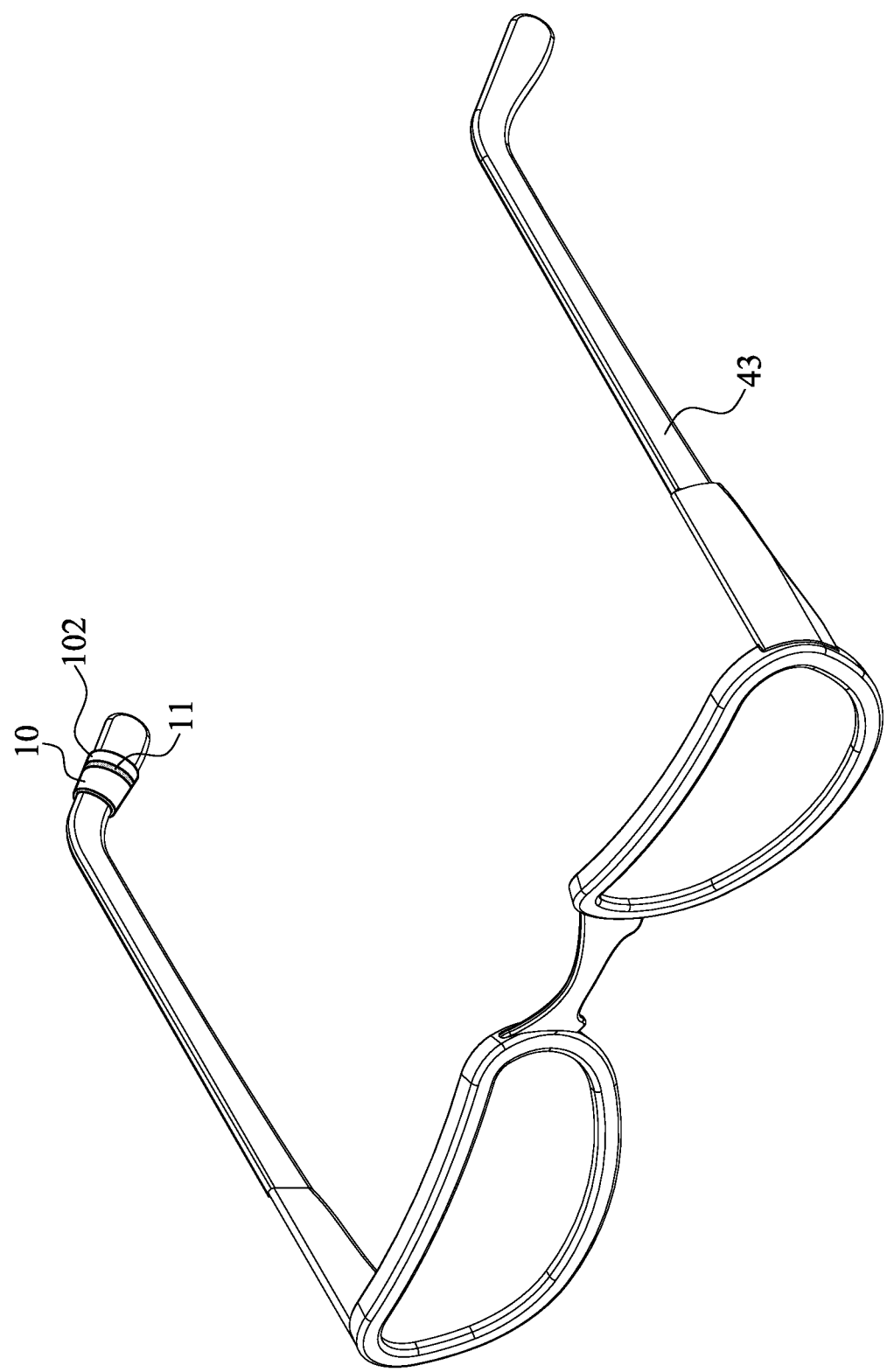
FIG. 4C is a perspective view of a detection module in application to a pair of glasses in accordance with some arrangements of the present disclosure.

The object 13 may be a device or a component. In some arrangements, the object 13 may be or include an ear plug as illustrated in FIG. 1A. It should be noted that the application and usage of the detection module 1 to the object 13 as illustrated in the figures are for illustrative purposes only, and not intended to limit the present disclosure. In another example, in some arrangements, the detection module 1 of the present disclosure may be used in combination with or applied to an earpiece 41 as illustrated in FIG. 4A, a watch 42 as illustrated in FIG. 4B, a pair of glasses 43 as illustrated in FIG. 4C, a skin patch, ring, belt, headband, neckband, wristband, shoe insole, garment, mobile device, or any other wearable components. The detection module 1 of the present disclosure may be configured to be used in combination with any wearable object, wearable device, or electronic device in the manner described herein.

Figure 4D:
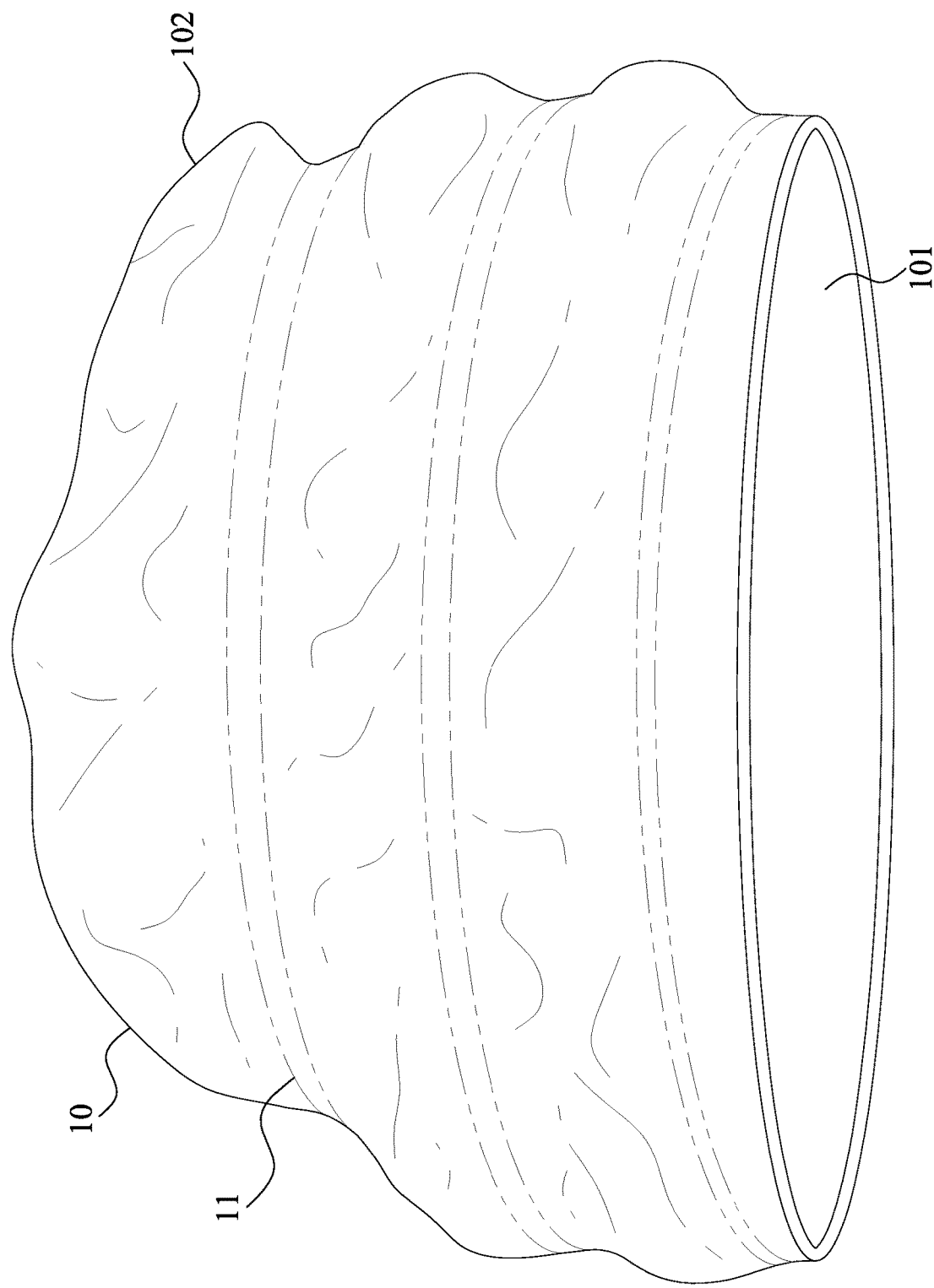
FIG. 4D is a perspective view of a detection module in application to a hat in accordance with some arrangements of the present disclosure.

In some arrangements, the detection module 1 itself may be any wearable device or any electronic device. For example, in some arrangements, the detection module 1 of the present disclosure may be a hat or a helmet lining as illustrated in FIG. 4D. In some arrangements, the detection module 1 of the present disclosure may be directly attached, connected, or fixed to a user's body (without any object such as the objects 13, 41, 42, and 43).

The carrier 10 and the object 13 may be manufactured separately first and then operatively coupled together in some examples. In other words, the carrier 10 and the object 13 may be separate articles. In some arrangements, the carrier 10 may also referred as a "coat," given that as shown, the carrier 10 may cover at least a portion of the object 13, thus functioning as a coat of the object 13. The carrier 10 may be attached, connected, or fixed to the object 13. For example, the carrier 10 may be mounted on the object 13. For example, the carrier 10 may be directly attached to the object 13. In some arrangements, the carrier 10 may be attached to the object 13 through other equipment or carriers. In some arrangements, the carrier 10 may be attached to the object 13 through an adhesive, a solder paste, or other medium. In some arrangements, the carrier 10 may be attached to the object 13 through bonding, stapling, or other ways. When the carrier 10 is operatively coupled to the object 13, the carrier 10 may at least partially enclose, wrap, cover, or surround the object 13, thus functioning as both a supporter to support the sensing element 11 and a coat to at least partially cover the object 13. In some arrangements, when the carrier 10 is operatively coupled to the object 13, the carrier 10 or at least a portion thereof is in contact with or adjacent to a surface of the object 13 that facing the user (e.g., the skin or another suitable part of the user). In some arrangements, the carrier 10 can be configured to conform to the shape of the object 13 by virtue of the shape of the carrier 10 being capable of physical manipulation. In other words, the shape of the carrier 10 may be flexibly adjusted to conform to the shape of the object 13. In some arrangements, the shape of the carrier 10 may flexibly adjusted to cover and be further supported by the object 13. For example, the shape, material, or the outline of the carrier 10 can be configured to be adjustable (e.g., at least one of twistable, stretchable, expandable, bendable, or flexible) to fit the shape (e.g., the exterior surface) of the object 13. In some arrangements, when the carrier 10 is attached to the object 13, the carrier 10 may be in contact with or adjacent to the skin of the user of the object 13. For example, when the carrier 10 is attached to the object 13, the carrier 10 may be in contact with or adjacent to a part or a region of the user for which the signals or biosignals are to be detected. The shape of the carrier 10 may also at least partially conform to a shape of the part or the region of the user so that the sensing element 11 supported by the carrier 10 can detect signals or biosignals from the user more precisely. In some examples, when the object 13 with the carrier 10 coupled thereto is worn by the user, at least a portion of the carrier 10 may be between the object 13 and the user.

In some arrangements, the carrier 10 may be made from one or more materials that are adjustable. For example, the carrier 10 can be made from a fabric (such as a woven fabric), fibers (such as textile fibers, natural fibers, and synthetic fibers), a composite material including fibers, or other suitable materials such as a stretchable material, an elastic material, a soft material, a flexible material, or so on. The carrier 10 may be stretchable and flexible enough to conform to the object 13. For example, when the carrier 10 is used in combination with the object 13, the carrier 10 is deformed from its original state (e.g., stretched or otherwise physically manipulated) to conform to the shape of the object 13. For example, the carrier 10 may lean on and be structurally supported by the object 13. In some arrangements, the carrier 10 may include at least one material which can resist a high stress, impact, twisting, or other physical or structural changes once operatively coupled to the object. In some examples, the carrier 10 may be made from a resilient material. In some arrangements, the carrier 10 may be water-resistant, water-repellent, or waterproof.

In some arrangements, the carrier 10 may have a surface (or an internal surface) 101 and a surface 102 (or an external surface) opposite to the surface 101. The surface 101 may define a space for receiving the object 13. The surface 101 may face the object 13. When the object 13 is operatively coupled to the carrier 10, at least a part of the surface 101 may be supported by the object 13, in contact with the object 13 or be at least adjacent to the object 13. When the object 13 (such as an ear plug) is worn by a user, the surface 102 of the carrier 10 may be in contact with or adjacent to the user, and the surface 101 of the carrier 10 may be physically spaced apart from the user (by at least a thickness of the carrier 10). When the object 13 (such as an ear plug) is worn by a user, the object 13 may be physically spaced apart from the user (by at least the thickness of the carrier 10), and the carrier 10 may be between the object 13 and the user.

In some arrangements, as illustrated in FIG. 1A, the carrier 10 may have one open end and one closed end opposite to the open end. The closed end may face, be adjacent to, or contact the user when the object 13 is worn by the user. The open end may face in a direction extending away from the user when the object 13 is worn by the user. However, in other arrangements, the carrier 10 may have two open ends.

Figure 1B:
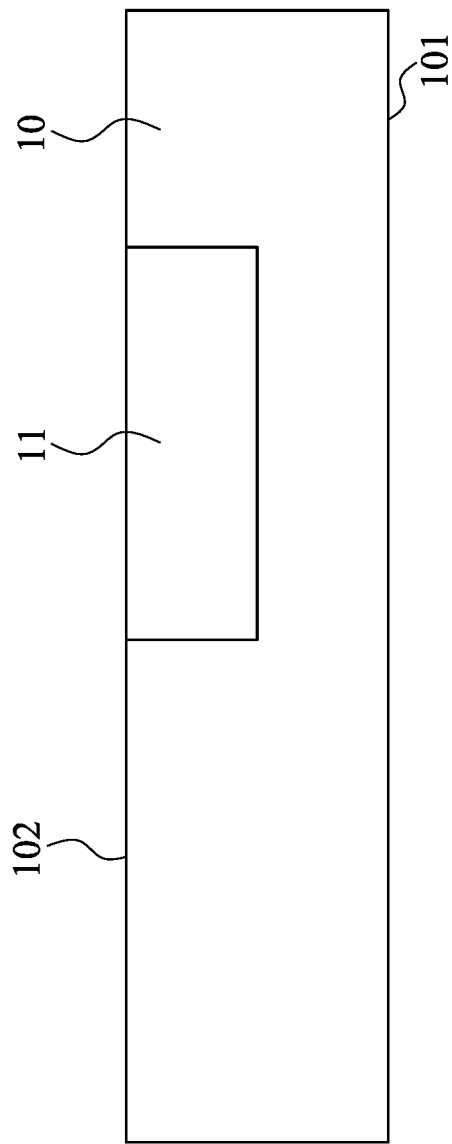
FIG. 1B is a cross-sectional view of a portion of a detection module in accordance with some arrangements of the present disclosure.

In some arrangements, the sensing element 11 may be physically separated from the object 13. For example, the sensing element 11 and the object 13 may be separate articles and manufactured separately. For example, the sensing element 11 may be physically separated from the object 13 through the carrier 10. In some arrangements, the sensing element 11 may be insulated from the object 13, such that air or another insulating component is between the sensing element 11 and the object 13. The sensing element 11 may be supported by the carrier 10. The sensing element 11 may be at least partially integrated within (e.g., embedded in or connected to) the carrier 10. The sensing element 11 may be a part of the carrier 10. At least a portion of the sensing element 11 may be surrounded by, embedded in, or covered by the carrier 10. The sensing element 11 may be in contact with the carrier 10. At least a portion of the sensing element 11 may be at least partially exposed by the carrier 10. For example, the sensing element 11 may be at least partially exposed by the surface 102 (such as illustrated in FIG. 1B). As shown in FIG. 1B, a surface of the sensing element 11 is exposed from the surface 102. In some arrangements, the sensing element 11 may be substantially coplanar with the surface 102 and/or the surface 101. When the object 13 (with the carrier 10 attached to it) is worn by a user, the sensing element 11 may be in contact with the user through the surface 102. For example, when the object 13 (with the carrier 10 attached to it) is worn by a user, the sensing element 11 may directly contact the user. For example, when the object 13 (with the carrier 10 attached to it) is worn by a user, the surface 102 may face the user (e.g., the skin or another suitable part of the user). For example, when the object 13 (with the carrier 10 attached to it) is worn by a user, the sensing element 11 may be disposed between the carrier 10 and the user (e.g., the skin or another suitable part of the user).

Figure 1C:
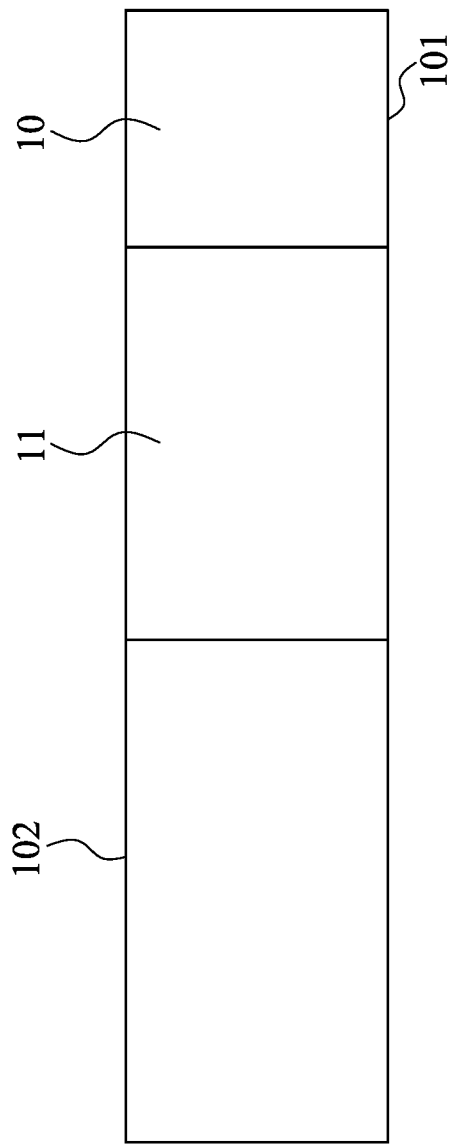
FIG. 1C is a cross-sectional view of a portion of a detection module in accordance with some arrangements of the present disclosure.

In some arrangements, the sensing element 11 may be at least partially exposed by both opposite sides (e.g., the surface 101 and the surface 102) of the carrier 10, as illustrated in FIG. 1C. When the carrier 10 is turned inside out, the object 13 may be instead received in the space defined by the surface 102 (similar to the surface 101 shown in FIG. 1A), and the surface 101 may be the external surface (which faces away from the object 13, similar to the surface 102 shown in FIG. 1A). When the object 13 (with the carrier 10 attached to it) is worn by a user, the sensing element 11 may be in contact with the user through the surface 101 instead of the surface 102. Therefore, the sensing element 11 may be in contact with the user either through the surface 102 or through the surface 101, providing further implementation flexibility. For example, when the object 13 (with the carrier 10 attached to it) is worn by a user, the sensing element 11 may directly contact the user. For example, when the object 13 (with the carrier 10 attached to it) is worn by a user, the surface 101 may face the user (e.g., the skin or another suitable part of the user).

Figure 2A:
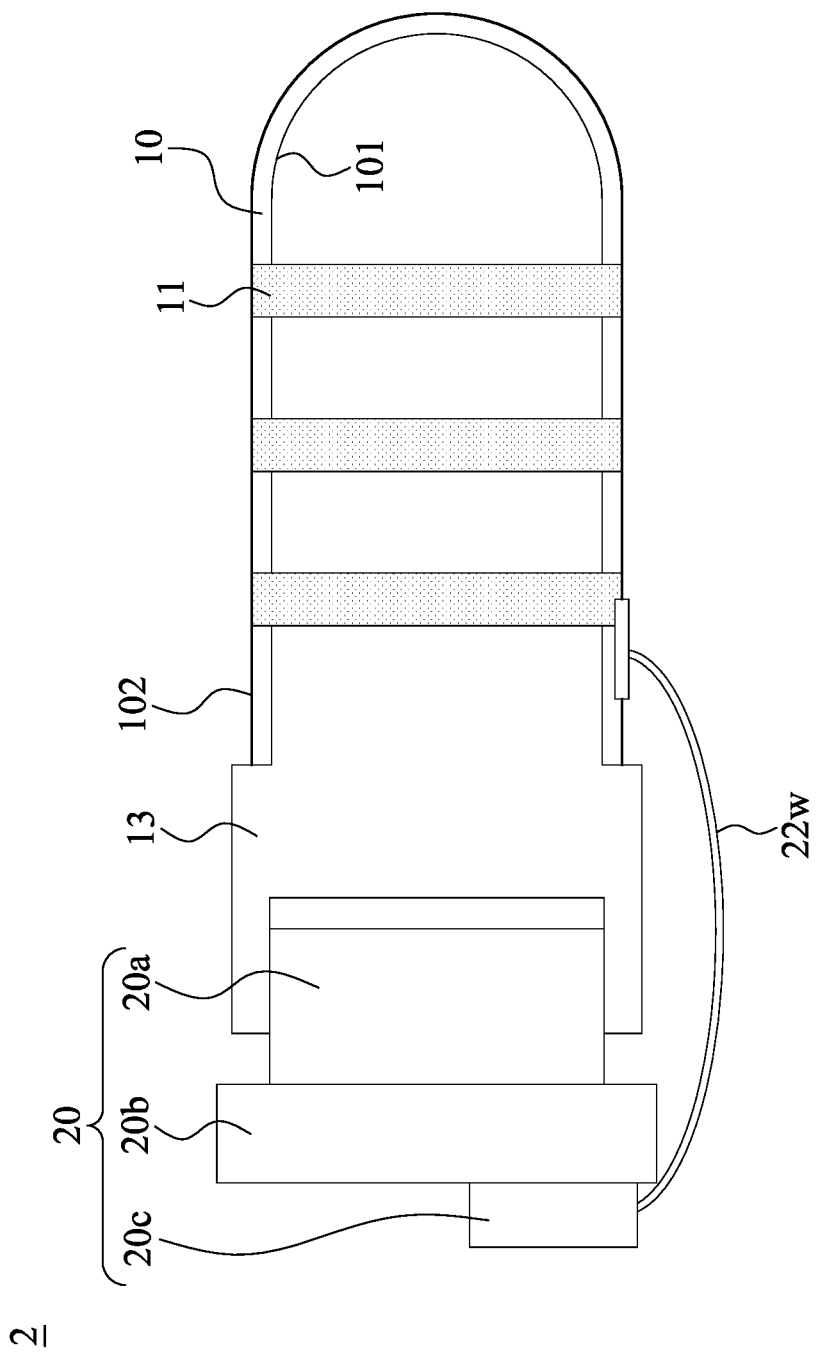
FIG. 2A is a cross-sectional view of a detection module in accordance with some arrangements of the present disclosure.

In some arrangements, the sensing element 11 may include electrodes. As shown in FIGS. 1A and 2A, the sensing element 11 includes three strips of electrodes, although any number of elements or units of the sensing element 11 can be implemented. In some arrangements, the sensing element 11 may be used to detect or collect information such as one or more signals (e.g., electric signals including voltage and/or current) from a location of the user that is external to the detection module 1. For example, the sensing element 11 may be used to detect one or more electric signals associated with the user of the detection module 1. For example, the sensing element 11 may be used to detect one or more electric signals that can be transformed or converted to biosignals of the user. In some arrangements, the biosignals may include signals in living beings. In some arrangements, the biosignals may include time, space, or space-time records of a biological event such as a beating heart or a contracting muscle. In some arrangements, the biosignals may include signals that can be continually monitored. In some arrangements, the biosignals may include signals that cannot be continually monitored. In some arrangements, the biosignals may include electrical biosignals. For example, the electric signals may be further processed (for example, through the package 20 in FIG. 2A) to generate or determine a biological parameter of the user, such as a pulse travel time (PTT), an electroencephalogram (EEG), electrocardiogram (ECG), electromyogram (EMG), electrooculogram (EOG), galvanic skin response (GSR), sweat composition, pH, heart rate variability (HRV), or other biologically-relevant information associated with the user. In some arrangements, the sensing element 11 may be used to detect or collect information other than electric signals, such as a temperature of the user.

In some arrangements, the sensing element 11 may include conductive ink (which may include conductive particles such as conductive nanoparticles), conductive yarn, or combinations thereof. In some arrangements, the conductive ink or the conductive yarn may be electrically connected with an electronic device (such as the electronic device 20a in FIG. 2A). In some arrangements, the sensing element 11 may be formed by implanting or weaving the conductive yarn with the carrier 10. In some arrangements, the sensing element 11 may be formed by filling or printing the conductive ink in the carrier 10. In some arrangements, the sensing element 11 may be configured to be at least one of twistable, stretchable, expendable, bendable, or flexible. For example, the sensing element 11 may be stretched along with the carrier 10 to conform to the shape of the object 13 by virtue of the shape of the sensing element 11 being capable of physical manipulation. In some arrangements, the shape of sensing element 11 may flexibly adjusted to cover the object 13. For example, the shape, material, or the outline of the sensing element 11 can be configured to be adjustable (e.g., at least one of twistable, stretchable, expandable, bendable, or flexible) to fit the shape (e.g., the exterior surface) of the object 13.

Sensors may be integrated into the housing or case of an object (or a device or a component, such as a wearable device or electronic device) or into garments, to obtain information or signals about the user's physical activities and/or health condition (e.g., biosignals). In other arrangements, the carrier 10 may be omitted, and the sensing element 11 may be integrated in a housing or a case of the object 13 to add a detection function to the object 13.

However, more sensors may be required to integrate into the housing or into the garments to add the detection functionality. As a result, size and weight of the housing or garments will inevitably increase if the carrier 10 is omitted, which may adversely affect user experience.

In addition, the sensors may be needed to remain constantly affixed to the skin of the user or for at least a period of time in order to obtain biosignals. However, the housing or the garments may have a definite shape which may not be well-suited or comfortable for all users. Connections between the sensors and the user may become unstable from time to time. For example, sensors may fall or detach from the user due to user activities or movement, which can also generate motion artifacts and signal distortion, thus hindering measurement accuracy and efficiency.

According to some arrangements of the present disclosure, the materials and/or the textures (e.g., the fabric textures) of the sensing element 11 and the carrier 10 may improve skin-friendliness, and may enhance connection stability between the sensing element 11 and the skin. In some examples, the sensing element 11 may remain affixed, attached, or otherwise coupled to the skin or at least the chances of detachment may be decreased during use. For example, given that the sensing element 11 and the carrier 10 may be between the object 13 and the skin of the user, and that the shapes of the sensing element 11 and the carrier 10 are stretchable and flexible, the sensing element 11 and the carrier 10 may be pressed against the skin and may be tightly held between the object 13 and the skin without irritating the skin or making the user uncomfortable.

In addition, by integrating the sensing element 11 in the carrier 10, the sensing element 11 may be attached to the object 13 to add a detection function to the original function of the object 13 or may be detached from the object 13 to remove the detection function, depending on the user's needs at that moment. In other words, the carrier 10 may be configured to be removably attached to the object 13 (detachable or removable with respect to the object 13 in an ad hoc manner). The carrier 10 may be detached from the object 13 without breaking the carrier 10, the sensing element 11, and the object 13. In some examples, the carrier 10 may be replaceable or changeable. Alternatively, the object 13 may be replaceable or changeable. This is convenient and cost-effective for the user, such that the user can use one object 13 with multiple carriers 10 and sensing elements 11 or can use one carrier 10 and sensing element 11 with multiple objects 13.

In some arrangements, the sensing element 11 may have a pattern, such as strips, blocks, or meshes. In some arrangements, the pattern of the sensing element 11 may help to improve the level of comfort while the object 13 (with the carrier 10 attached to it) is worn by the user. In some arrangements, the pattern of the sensing element 11 may help to increase the coverage of the sensing element 11 on the carrier 10 to increase the contact area with the user to improve comfort, and to improve the integrity if biosignals obtained through the sensing element 11.

The positions, functions, patterns, and numbers of sensing elements in the detection module 1 are not intended to limit the present disclosure. There may be any number of sensing elements in the detection module 1 due to design requirements.

Figure 2B:
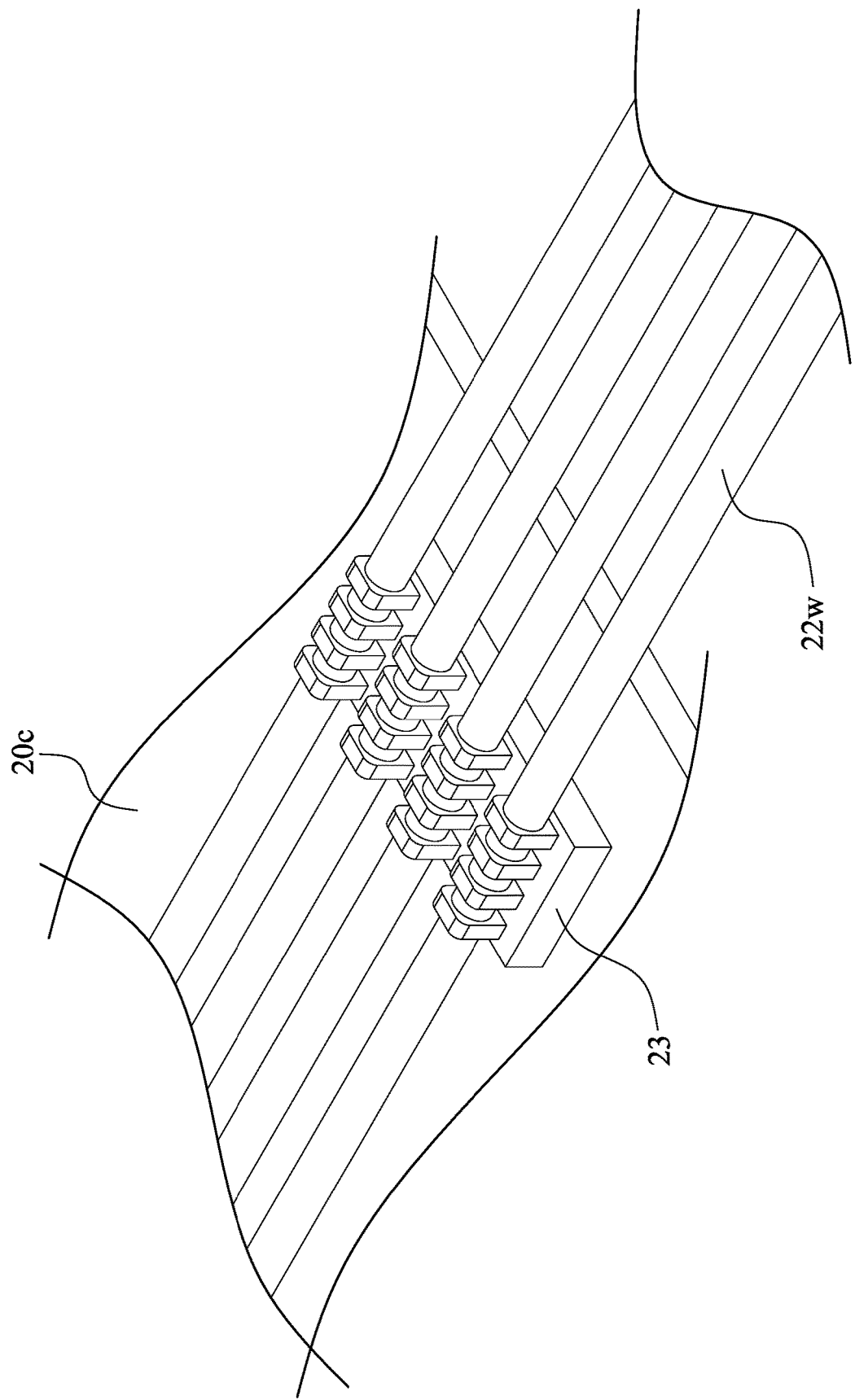
FIG. 2B is a perspective view of a portion of a detection module in accordance with some arrangements of the present disclosure.

FIG. 2A is a cross-section of a detection module 2 in accordance with some arrangements of the present disclosure. FIG. 2B is a perspective view of a portion of the detection module 2. The detection module 2 is similar to the detection module 1 in FIG. 1A, and similar features are not described for the sake of brevity. The differences between the detection module 1 and the detection module 2 are described as follows.

The detection module 2 includes a package 20 (e.g., a semiconductor device package). The package 20 may be electrically connected to the sensing element 11 through a connector 22w. In some arrangements, the connector 22w may include a flexible printed circuit (FPC), a conductive wire, a redistribution layer (RDL), or combinations thereof. In other arrangements, the sensing element 11 may be connected to the package 20 using alternative method(s) or component(s). For example, the sensing element 11 may be connected to the package 20 using any bridging element and/or any conductive pad. In some arrangements, a physical connection such as the connector 22w may be omitted, and the sensing element 11 may communicate with the package 20 through wireless communication (e.g., Wi-Fi, Bluetooth, cellular networks, near field communication (NFC), or any other wireless communication techniques).

As shown in FIG. 2B, the connector 22w may be connected with the connector 20c through a clamp 23. In some arrangements, the clamp 23 may be integral with the connector 20c, and the connector 22w may be connected to or disconnected from the connector 20c as needed.

In some arrangements, the transmission path between the sensing element 11 and the package 20 may be external to the object 13 and the carrier 10 as shown in FIG. 2A. For example, the transmission path between the sensing element 11 and the package 20 may be outside of the object 13 and the carrier 10 (external to external surfaces of the object 13 and the carrier 10). For example, the transmission path between the sensing element 11 and the package 20 may be not integrated with or embedded in the object 13 and the carrier 10.

In some arrangements, the sensing element 11 may be configured to be used in combination with the package 20 for further processing signals collected through the sensing element 11. For example, the sensing element 11 may be used to detect one or more biosignals (which may also be referred to as a "first signal") of the user. The biosignals may be pre-processed to obtain a second signal, which is transmitted from the sensing element 11 to the package 20 through a wired or wireless communication as described. For example, the second signal from the sensing element 11 can be further processed (e.g., converted to a digital signal, amplified, stored, transmitted, etc.) by the package 20. In some arrangements, the second signal can be processed to generate or determine a biological parameter of the user listed above, such as PTT, EEG, ECG, EMG, and so on. In some arrangements, the package 20 may be external to the object 13. As shown in FIG. 2A, in some examples, the package 20 may be in direct contact with the object 13. In some examples, the package 20 may be integrated with the object 13. In other examples, the package 20 may be physically spaced apart from (e.g., not directly contacting) the object 13 by a gap or by another element. In some arrangements, the package 20 may be integrated into the carrier 10. In some arrangements, the package 20 may be integrated with the sensing element 11 in the carrier 10.

In some arrangements, the package 20 may include a system-in-package (SiP). For example, the package 20 may include an electronic device 20a, a substrate 20b, and a connector 20c. The electronic device 20a and the connector 20c may be disposed on the substrate 20b. The electronic device 20a may be electrically connected to the sensing element 11 through the substrate 20b, the connector 20c, and the connector 22w.

In some arrangements, the electronic device 20a may be a chip or a die including a semiconductor substrate, one or more integrated circuit devices, and one or more overlying interconnection structures therein. The integrated circuit devices may include active devices such as transistors and/or passive devices such resistors, capacitors, inductors, or combinations thereof. In some arrangements, the electronic device 20a may include a data conversion component, a processing component, a storage component, a transmission component, or combinations thereof. In some arrangements, the electronic device 20a may include a motion sensor, such as an accelerometer or a gyroscope. In some arrangements, the biosignals obtained by the sensing element 11 may be processed (e.g., enhanced) by the electronic device 20a based on one or more algorithms using the motion sensor to remove motion artifacts.

In some arrangements, the detection module 2 may include a power supply. In some arrangements, the detection module 2 may be powered by an electronic device (such as the earpiece 41 in FIG. 4A) to which the detection module 2 is attached. For example, the sensing element 11 may be powered by a power supply in the object 13 through a wired communication or a wireless communication. In another example, the package 20 may be powered by a power supply in the object 13 through a wired communication or a wireless communication. In some arrangements, the power supply may be integrated in the package 20.

In some arrangements, the detection module 2 has a detection component for collecting biosignals from the user and a processing part for processing the collected biosignals. The processing part may be integrated into (e.g., connected to, embedded in, or otherwise operatively coupled to) the package 20. The detection component and the processing part may be physically separated. In some arrangements, the detection component and the processing part may be separate articles and manufactured separately. In some arrangements, the detection component may be physically separated from the processing part through air or another component. In some arrangements, the detection component and the processing part may be distinct articles. As shown in FIG. 2A, the sensing element 11 and the package 20 may be physically separated and not in direct contact with one another. By separating the sensing element 11 and the package 20, the detection component of the detection module 2 may be further miniaturized.

Figure 3A:
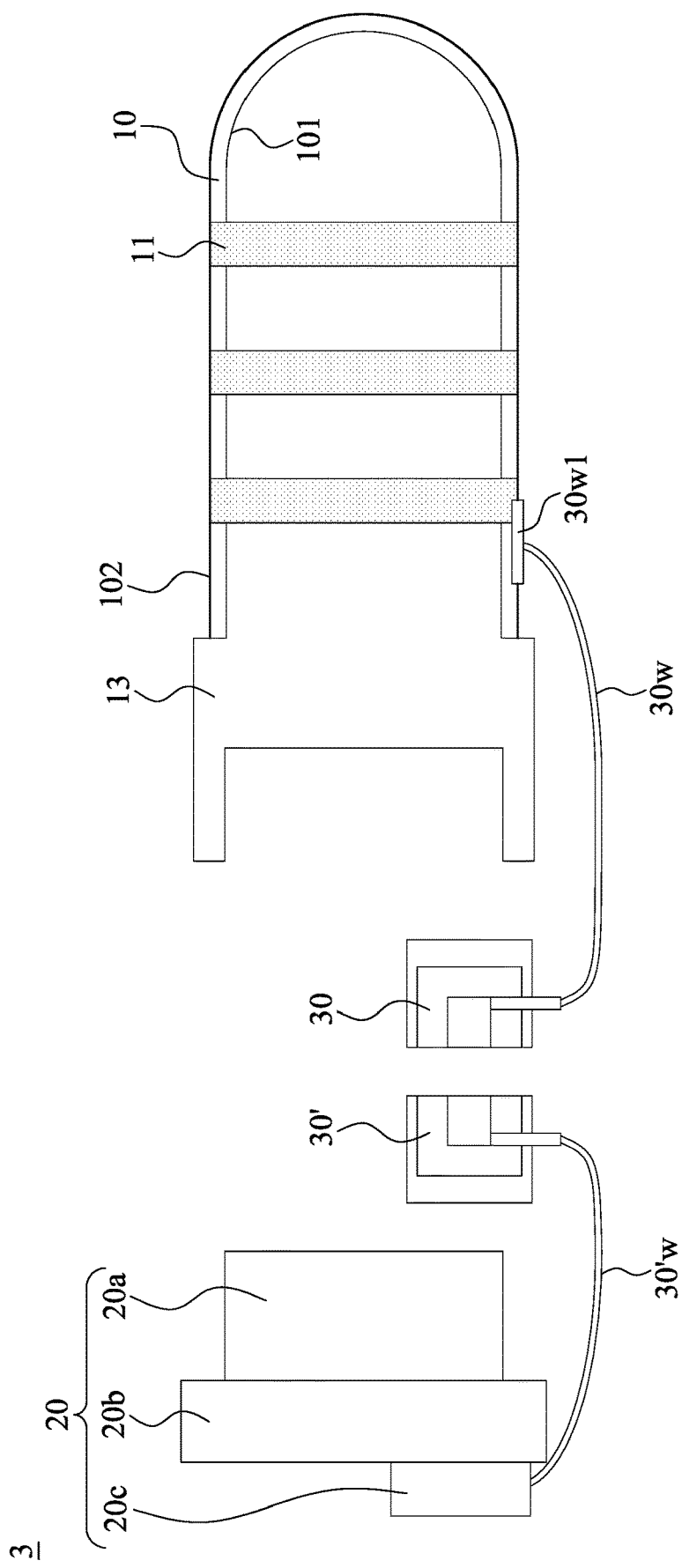
FIG. 3A is a cross-sectional view of a detection module in accordance with some arrangements of the present disclosure.
Figure 3B:
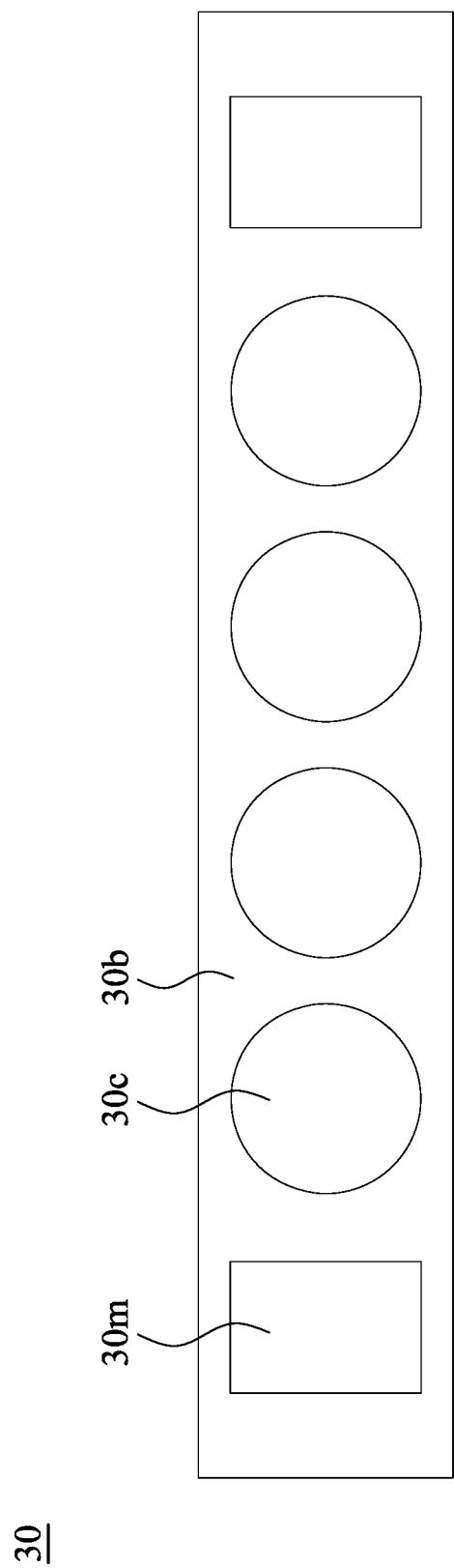
FIG. 3B is a cross-sectional view of a portion of a detection module in accordance with some arrangements of the present disclosure.

FIG. 3A is a cross-section of a detection module 3 in accordance with some arrangements of the present disclosure. FIG. 3B is a perspective view of a portion of the detection module 3. The detection module 3 is similar to the detection module 2 in FIG. 2A, and similar features are not described for the sake of brevity. The differences between the detection module 2 and the detection module 3 are described as follows.

The detection module 3 includes magnets 30 and 30' and connectors 30w and 30'w to connect the package 20 and the sensing element 11. The connectors 30w and 30'w may be conductive wires. As shown, the package 20, and in particular the connector 20c is connected to or otherwise operatively coupled to the magnet 30' via the connector 30'w. The sensing element 11 is connected to or otherwise operatively coupled to the magnet 30 via the connector 30w. For example, a terminal or an input/output port 30w1 of the sensing element 11 may be connected to or otherwise operatively coupled to the connector 30w. By connecting the magnets 30 and 30', a communication path is formed such that signals can be communicated from the sensing element 11, through the connector 30w, the magnet 30, the magnet 30', the connector 30w', to the connector 20c. The selecting mating of the magnets 30 and 30' can be used to communicably connect the package 20 and the sensing element 11 as needed.

As shown in FIG. 3B, each of the magnet 30 or 30' has a base 30b, at least one magnetic part 30m, and at least one conducting part 30c. The magnetic part 30m may help to fix or position the conducting part 30c. For example, when the magnetic part 30m of the magnet 30 mates with the magnetic part 30m of the magnet 30' due to magnetic attraction, the conduct part 30c of the magnet 30 aligns with and comes in contact with the conductive part 30c of the magnet 30', thus completing the communication path.

Figure 3C:
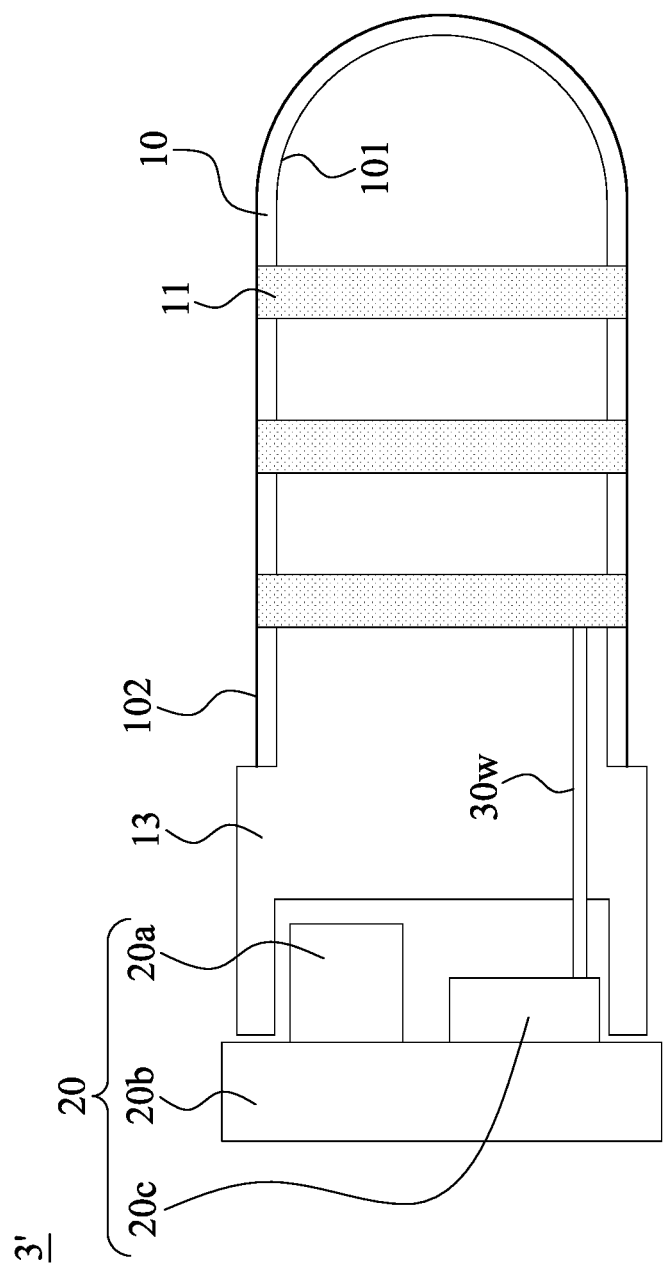
FIG. 3C is a cross-sectional view of a detection module in accordance with some arrangements of the present disclosure.

FIG. 3C is a cross-section of a detection module in accordance with some arrangements of the present disclosure. The detection module 3' in FIG. 3C is similar to the detection module 3 in FIG. 3A, and similar features are not described for the sake of brevity. The differences between the detection module x and the detection module 3 are described as follows.

As shown in FIG. 3C, the connector 30w is integrated within (e.g., at least partially embedded in an interior volume of) the object 13. The connector 30w may be formed on a surface of the object 13. At least a portion of the connector 30w may be formed on an external surface of the object 13, such as on a housing of the object 13. When the carrier 10 is attached to the object 13, the sensing element 11 may align, come in contact with, and become electrically connected with the connector 30w. The sensing element 11 may be electrically connected with the package 20 through the connector 30w.

Figure 3D:
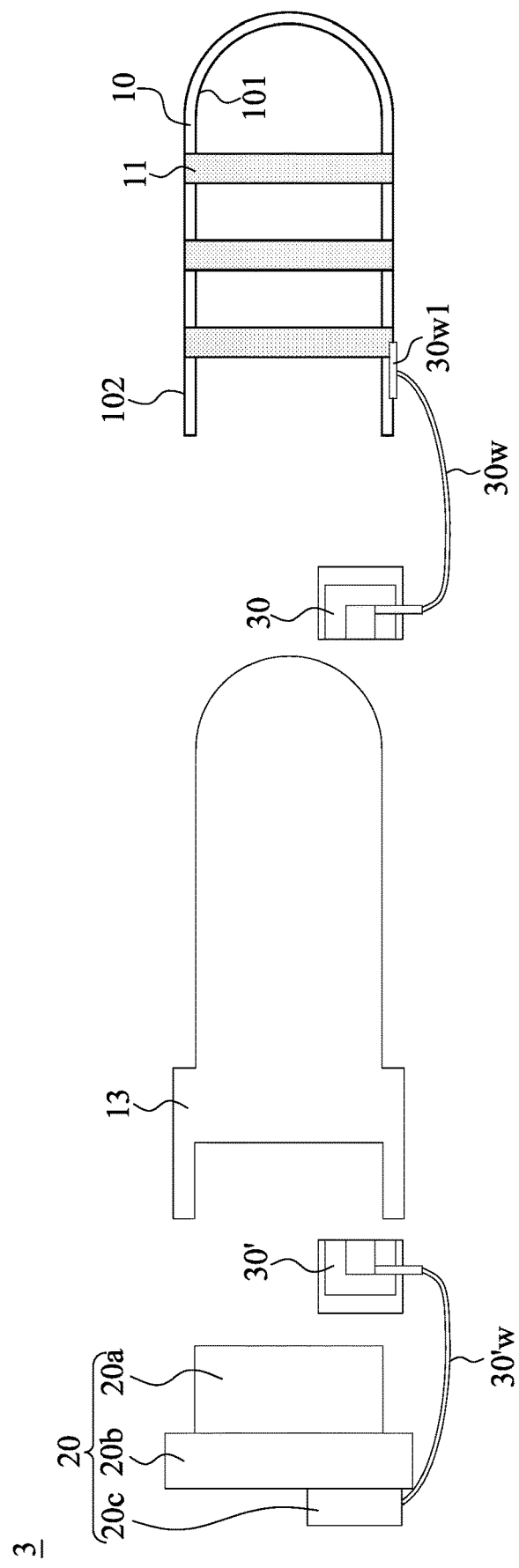
FIG. 3D is an exploded view of a detection module in accordance with some arrangements of the present disclosure.

FIG. 3D is an exploded view of the detection module 3 in FIG. 3A in accordance with some arrangements of the present disclosure.

Referring to FIG. 3A and FIG. 3D, in some arrangements, the carrier 10 may be attachable to the object 13 as shown in FIG. 3A. In some arrangements, the carrier 10 may be detachable from the object 13 as shown in FIG. 3D.

Figure 3E:
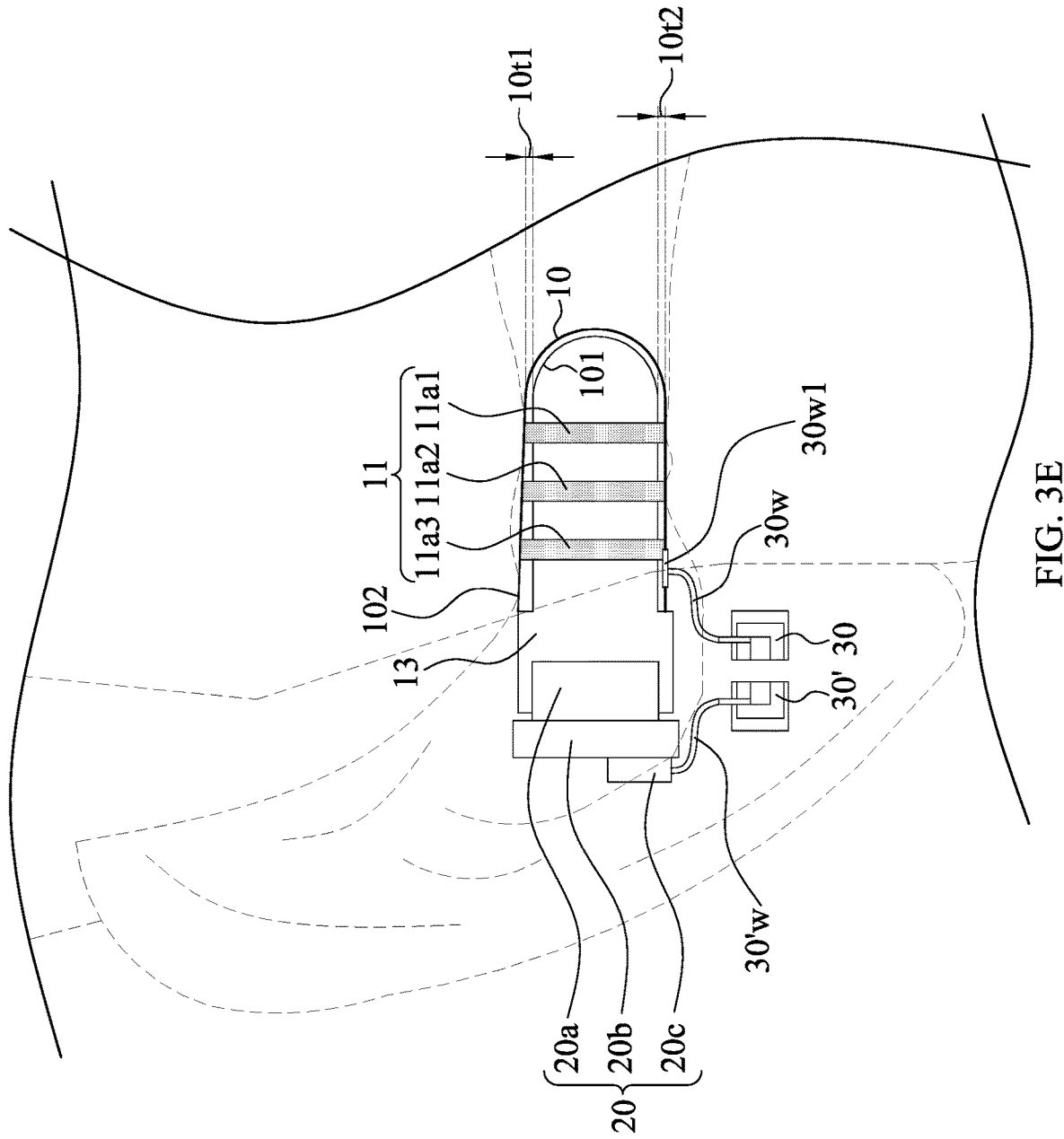
FIG. 3E is a cross-sectional view of a detection module while being worn by a user in accordance with some arrangements of the present disclosure.

FIG. 3E is a cross-sectional view of the detection module 3 in FIG. 3A while being worn by a user in accordance with some arrangements of the present disclosure.

As shown in FIG. 3E, in some arrangements, the surface 101 of the carrier 10 may be flexibly adjusted to cover the object 13. The surface 102 of the carrier 10 may be flexibly adjusted according to a shape, a size, and/or a profile of a user's skin (such as a user's ear canal). The surface 102 of the carrier 10 may be flexibly adjusted to be conformed to a shape, a size, and/or a profile of the ear canal of the user so that the sensing element 11 supported by the carrier 10 can detect signals or biosignals from the user more precisely. In some arrangements, the carrier 10 may function as a buffer between the object 13 and the user's skin. For example, the carrier 10 may provide a buffer distance between the object 13 and the user's skin. For example, the carrier 10 may buffer the distance between the object 13 and the user's skin. In some arrangements, the thicknesses of the carrier 10 on different locations may be different. For example, the thickness 10t1 and the thickness 10t2 may be different. For example, the thickness 10t1 may be non-uniform. In some arrangements, the carrier 10 may help to press the sensing element 11 against the ear canal of the user so that the sensing element 11 supported by the carrier 10 can detect signals or biosignals from the user more precisely. In some arrangements, the sensing element 11 and the carrier 10 may be pressed against the ear canal of the user and may be tightly held between the object 13 and the ear canal of the user without irritating the skin or making the user uncomfortable. In some arrangements, the carrier 10 may function as a buffer between the sensing element 11 and the object 13. For example, the carrier 10 may provide a buffer distance between the sensing element 11 and the user's skin. For example, the carrier 10 may buffer the distance between the sensing element 11 and the user's skin. In some arrangements, the carrier 10 may be flexibly adjusted to be conformed to a shape, a size, and/or a profile of the ear canal of everyone.

In some arrangements, the user's ear canal may be uneven, and the carrier 10 may help to press at least one of the sensing elements 11 (such as the sensing element 11a1) against the ear canal of the user. In some arrangements, some of the sensing elements 11 (such as the sensing elements 11a2 and 11a3) may not press against the ear canal of the user as the sensing element 11a1 does. The sensing element 11a2 may contact the ear canal of the user on one side and be spaced apart from the ear canal of the user on the other side. The sensing element 11a3 may be spaced apart from the ear canal of the user on both sides. In some arrangements, the package 20 (such as the electronic device 20a or another electronic device thereof) may receive and select the best (such as the clearest or the most complete) signals or biosignals. In some arrangements, the package 20 (such as the electronic device 20a or another electronic device thereof) may process the signals or biosignals through a weighting process by emphasizing the contribution of the sensing element 11a1 over the sensing elements 11a2 and 11a3 to an outcome or result. In some arrangements, the package 20 (such as the electronic device 20a or another electronic device thereof) may obtain an outcome or result based on the average signals or biosignals. By doing so, a more precise biological parameter of the user may be obtained.

FIGS. 4A, 4B, 4C, and 4D are perspective views of the detection module 1 of FIG. 1A being applied to a device in accordance with some arrangements of the present disclosure.

As shown in FIG. 4A, the earpiece 41 (e.g., an object) may be partially covered by the carrier 10. When the earpiece 41 is worn, the surface 102 of the carrier 10 may be in contact with the user, and the sensing element 11 may be in contact with the user through the surface 102.

As shown in FIG. 4B, the watch 42 (e.g., an object) may be partially covered by the carrier 10. When the watch 42 is worn, the surface 102 of the carrier 10 may be in contact with the user, and the sensing element 11 may be in contact with the user through the surface 102.

As shown in FIG. 4C, the temples of the pair of glasses 43 (e.g., an object) may be partially covered by the carrier 10. When the pair of glasses 43 is worn, the surface 102 of the carrier 10 may be in contact with the user, and the sensing element 11 may be in contact with the user through the surface 102.

As shown in FIG. 4D, the detection module may be a hat or a helmet lining (without any object such as the earpiece 41, the watch 42, the glasses 43, or so on). When the hat or helmet lining is worn, the surface 101 of the carrier 10 may be in contact with the user, and the sensing element 11 may be in contact with the user through the surface 101.

As used herein, the singular terms "a," "an," and "the" may include a plurality of referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" parallel can refer to a range of angular variation relative to 0° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°. For example, "substantially" perpendicular can refer to a range of angular variation relative to 90° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific arrangements thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other arrangements of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. A detection module, comprising:
   a carrier configured to be adjustable to at least partially cover an earpiece and conform to a shape of the earpiece, wherein the carrier includes an open end and a closed end opposite to the open end;
   a sensing element disposed on the carrier and at least partially exposed from the carrier, wherein the sensing element is configured to surround the earpiece, and wherein the sensing element is configured to be twistable so that it can be twisted along with the carrier to conform to the shape of the earpiece; and
   a package structure configured to be disposed outside of an exterior surface of the carrier and supported at the open end of the carrier by the earpiece, wherein the package structure is configured to be electrically connected with the sensing element through a first conductive wire disposed outside of the exterior surface of the carrier, wherein the package structure has a motion sensor, and wherein the package structure is configured to process a bio-signal using the motion sensor to remove motion artifacts.

2. The detection module of claim 1, wherein the package structure has a substrate over which the motion sensor is disposed, and wherein the motion sensor is housed in a recess of the earpiece and covered by the substrate.

3. The detection module of claim 2, wherein the substrate is spaced apart from the earpiece.

4. The detection module of claim 3, wherein a width of the substrate is greater than a width of the earpiece in a cross-sectional view.

5. The detection module of claim 1, further comprising a terminal disposed on the exterior surface of the carrier and contacting the sensing element.

6. The detection module of claim 5, further comprising a magnet, wherein the first conductive wire connects with the terminal through the magnet, and when the earpiece is worn by a user, the magnet is suspended outside an ear of the user.

7. The detection module of claim 5, wherein the terminal having a long side extending parallel to a direction extending from the open end to the closed end.

8. The detection module of claim 7, further comprising a second conductive wire bonded to the terminal and configured to electrically connect the sensing element to the package structure, wherein a bonding direction of the second conductive wire is substantially perpendicular to the terminal and the direction.

9. The detection module of claim 1, further comprising:
a first connecting element configured to electrically connect the package structure through the first conductive wire; and
a second connecting element configured to electrically connect the sensing element through a second conductive wire,
wherein the first connecting element is configured to be magnetically connected to the second connecting element, and
wherein when the earpiece is worn by a user, the first connecting element and the second connecting element are suspended outside an ear of the user.

10. The detection module of claim 1, further comprising:
a second conductive wire connecting with the sensing element; and
a first magnet and a second magnet connected between the first conductive wire and the second conductive wire;
wherein the first magnet and the second magnet are configured to either attract or separate from each other, thereby forming an electrical connection path between the package structure and the sensing element, or disconnecting the package structure from the sensing element.

11. A detection module, comprising:
a carrier configured to be adjustable to at least partially conform to a shape of an earpiece;
a substrate having a width greater than a width of the earpiece in a cross-sectional view;
an electronic device disposed over the substrate and configured to be attachable to and detachable from a recess of the earpiece; and
a sensing element configured to be attachable to and detachable from the earpiece through the carrier and electrically connected with the electronic device, wherein the sensing element is disposed on an external side of the earpiece and configured to detect a bio-signal from the external side of the earpiece,
wherein the electronic device and the carrier are configured to be separated by the earpiece.

12. The detection module of claim 11, wherein the earpiece includes a base portion and a protruding portion protruded from the base portion, and wherein the carrier covers the protruding portion and expose the base portion, and a surface of the base portion is substantially coplanar with the external side of the earpiece.

13. The detection module of claim 12, wherein the sensing element has a strip crossing over the protruding portion from a cross-sectional view.

14. The detection module of claim 12, wherein the protruding portion protrudes from a surface of the base portion, and the carrier contacts a periphery portion of the surface of the base portion.

15. The detection module of claim 14, wherein the substrate is supported by the electronic device and spaced apart from the earpiece.

16. The detection module of claim 11, wherein the substrate provides an electrical connection between the electronic device and the sensing element.

17. The detection module of claim 11, further comprising a connector disposed over the substrate and connecting with the sensing element through a magnet, when the earpiece is worn by a user, the magnet is suspended outside an ear of the user.

18. The detection module of claim 11, wherein the electronic device is connected with the sensing element through a conductive wire disposed outside of the external side of the earpiece.

19. The detection module of claim 18, wherein the electronic device has a motion sensor and is configured to process the bio-signal to remove motion artifacts.

20. The detection module of claim 13, wherein the width of the substrate is greater than a width of the strip.

* * * * *